United States Patent [19]
Gazes

[11] Patent Number: 5,852,939
[45] Date of Patent: Dec. 29, 1998

[54] HEATING AND AIR CONDITIONING DEVICE USING GEOTHERMAL HEAT EXCHANGE

[76] Inventor: Jimmy Gazes, 803 O'Sullivan Dr., Mt. Pleasant, S.C. 29464

[21] Appl. No.: 850,848

[22] Filed: May 2, 1997

[51] Int. Cl.[6] ..................................................... F25B 13/00
[52] U.S. Cl. ............................................ 62/260; 62/324.6
[58] Field of Search .................................. 62/260, 324.4, 62/324.6, 197; 165/45

[56] References Cited

U.S. PATENT DOCUMENTS 4,765,149 8/1988 Shiga et al. ............................. 62/324.4
4,920,757 5/1990 Gazes ......................................... 62/260

Primary Examiner—John M. Sollecito
Attorney, Agent, or Firm—B. Craig Killough

[57] ABSTRACT

A heat pump heating and cooling system uses heat exchange coils which are located vertically in the ground. A double evaporator is used as a condenser in the heating cycle, and a single evaporator is used in the cooling cycle. The device sub-cools the liquid refrigerant during the cooling cycle, and super heats the refrigerant in the heating cycle, increasing the efficiency over prior art heat pump systems. No receiver for excess refrigerant is required, and problems associated with liquid refrigerant settling in the vertical ground coils are eliminated.

4 Claims, 2 Drawing Sheets

HEATING AND AIR CONDITIONING DEVICE USING GEOTHERMAL HEAT EXCHANGE

BACKGROUND AND SUMMARY OF THE INVENTION

This invention relates generally to heating and/or cooling systems and is specifically directed to a heating system in which heat exchange is accomplished through the use of an outside air treated heat exchanger, in conjunction with a limited number of heat conductive refrigerant ground coils which are vertical inserted into the ground.

In air conditioning systems commonly in use, and in heat pump systems, heat exchange between a refrigerant contained within the system and the environment is required. Most commonly, this heat exchange is accomplished by means of ambient air, wherein the refrigerant is directed to an outdoor coil, and heat exchange between the refrigerant contained with the coil is made with the outside air.

The problem associated with heat exchange with outside air is the inconsistency of the temperature of the outside air. Since heat for the heating cycle of a heat pump is obtained from the outside air, the system loses its efficacy and efficiency as the outside air temperature drops, since there is less heat in the air to extract. This problem is compounded since, as the temperature drops, additional heat is needed to heat the building.

There is a need to manufacture more efficient air to air systems. The effective surface area of outside condensers or evaporators has been increased, and the coils are manufactured to operate on a single pass basis. Previously, two and three passes were used in the condenser or evaporator coils, which required less space and smaller cabinets, but operated at less efficiency. As air passes through a condenser, or an evaporator, the first row of coils that is exposed to the outside ambient air is the most efficient, and efficiency decreases with every row thereafter. The second and third rows, or passes, of these coils are less efficient than a second or third row of coils which are exposed to either colder or warmer air, depending on whether the coils are operating as a condenser or an evaporator.

A significant disadvantage of single pass condensers or evaporators is the very large cabinets needed to house these coils. Another disadvantage is that the outdoor coil is limited in efficiency in direct proportion to the ambient air temperature.

To overcome the problems associated with heat exchange with the outside ambient air, water and geothermal means have been employed for heat exchange. In a water system heat exchange, the refrigerant contained within the system is exposed, by means of the refrigerant contained with the coil, to water which is dynamically passed across the coil. This type of system requires large quantities of water. Ground water is usually employed. Problems associated with this system includes the availability of ground water which can be efficiently obtained in sufficient quantities to achieve the desired, and required, heat exchange.

It has previously been recognized that geothermal heat exchange is potentially an efficient and effective way of achieving heat exchange. In heating and cooling systems, and especially heat pump type systems, since the ground temperature is relatively constant at about 68° F. at a depth below the frost line, the available heat is constant. However, a problem which has been associated with such systems is the means and manner in which the heat exchange coils or outdoor coils are placed into the ground to achieve geothermal heat exchange.

It is preferable to place the geothermal coils into the ground in a vertical fashion. Installation may be easily accomplished by drilling or boring holes into the ground, and vertically placing the geothermal outdoor coils into the holes. The coils are placed into the ground to a depth which is sufficient to overcome ground freezing problems associated with colder climates.

In the prior art, placing coils into the ground in a vertical fashion has not been workable, since refrigerant placed into the system, as it condenses in the ground coil, causes a liquid refrigerant build-up. The compressor is unable to properly move the refrigerant through the system when the liquid refrigerant settles within the ground coils, making the system unworkable. Damage to the compressor can occur when the liquid refrigerant is forced into the intake of the compressor, since compressors for such systems are designed for receiving and compressing gases only.

To overcome the problems associated with vertical outdoor geothermal coils, the coils have been placed into the ground in a horizontal fashion. Placing the coils into the ground in a horizontal fashion alleviates the problems of liquid refrigerant build-up, since there is not a low point which the refrigerant seeks, but horizontal coils require a vast amount of available ground to achieve the proper heat exchange, and requires the excavation of sufficient land to place enough grounds coils to achieve proper heat exchange. In colder climates, this excavation must also be to a sufficient depth to place the coils for proper heat exchange. In short, placing the geothermal coils in a horizontal fashion is more difficult, expensive, and requires must more available ground than does placing of coils into vertical holes.

Problems associated with the vertical ground coils were addressed, and solutions offered, in U.S. Pat. No. 4,920,757, excepting that in most instances, the number of vertical coils needed was relatively high, increasing the cost of the system.

SUMMARY OF THE PRESENT INVENTION

The present inventor incorporates an air cooled condensing unit, or an outside heat pump section, similar to devices now in use. The condensing unit or outside heat pump section is used in conjunction with vertical ground coils that sub-cool the condensed liquid refrigerant in the cooling cycle, and super heat the refrigerant in the heating cycle. Two indoor heat exchangers balance the system between the evaporator surface in the heating cycle, which may have two ground coils and an outside condenser, and which in this mode, is used as an evaporator. If the second indoor heat exchanger is not used, the system will be overloaded, and extremely high head pressures will render the system inoperable. The use of two indoor heat exchangers substantially increases the capacity of the system in the heating cycle. The combination of the ground coils and the air cooled condenser, operating in the heating cycle as an evaporator, increases the evaporator surface (face area) sufficiently so that these coils operate at a 10° or less temperature difference. The double evaporator used as a condenser in this cycle provides adequate surface for heat dissipation in the heating cycle, without the fear of extremely high discharge pressures.

As the temperature spread between the refrigerant temperature and the ground (or the ambient air which comes in contact with the coils) decreases, the suction pressure to the compressor increases. Manufacturer's data on compressors indicates that increases in suction pressures increase pumping capacity of the compressors. The greater the pumping capacity, the higher the BTU rating of the compressor. The higher the operating temperature, the warmer the coils and, in consequence, there is less need for defrost cycles.

This combination allows the system to be balanced on all cycles, and a large quantity of refrigerant can be used within the system to achieve maximum efficiency and efficacy. Demonstrable power consumption savings are achieved, while using a minimum number of ground coils.

DESCRIPTION OF THE PREFERRED EMBODIMENT

Figure 1:
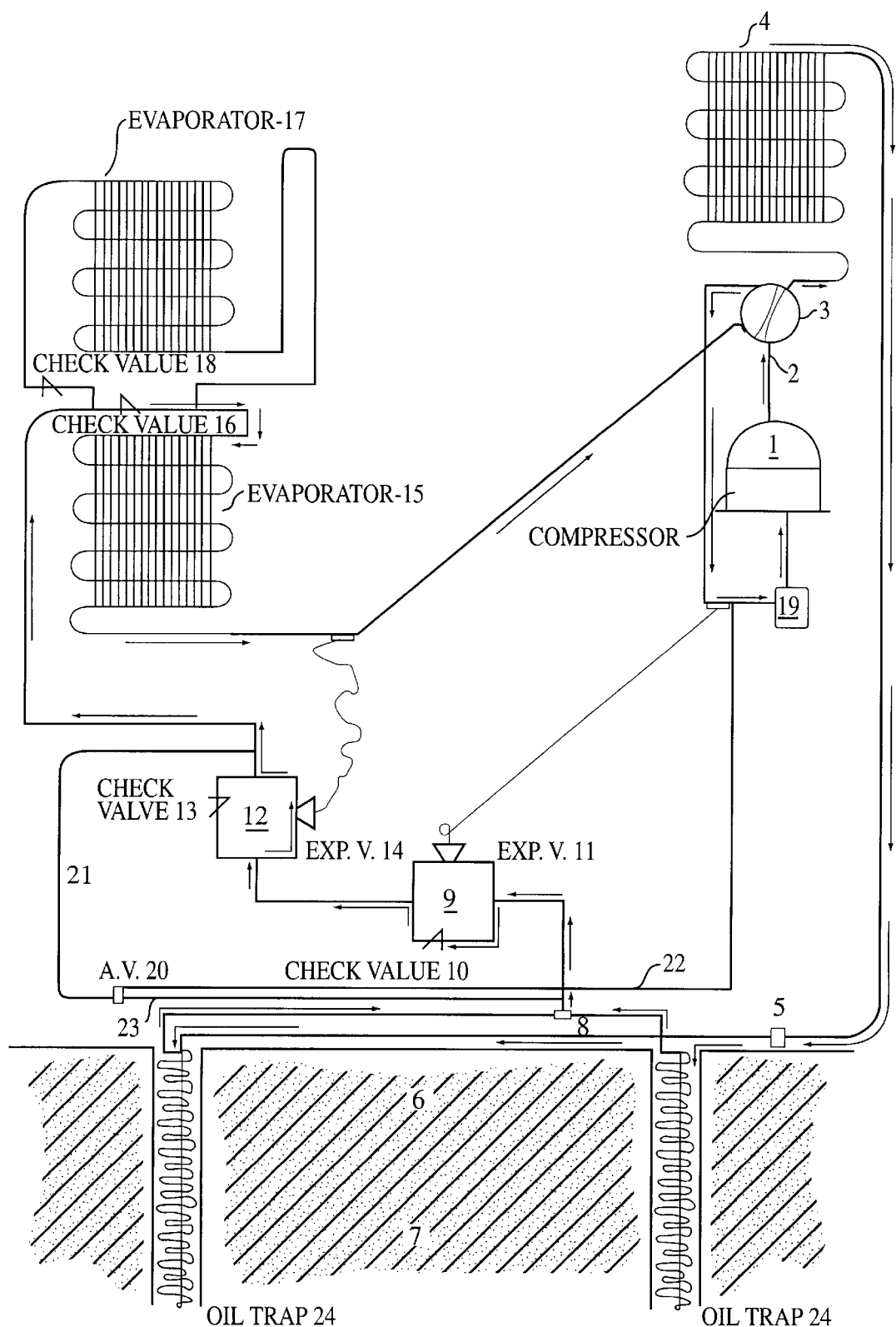
FIG. 1 is a schematic diagram of the device having a reverse cycle, with arrows indicating the direction of travel of the refrigerant through the system in the cooling cycle.
Figure 2:
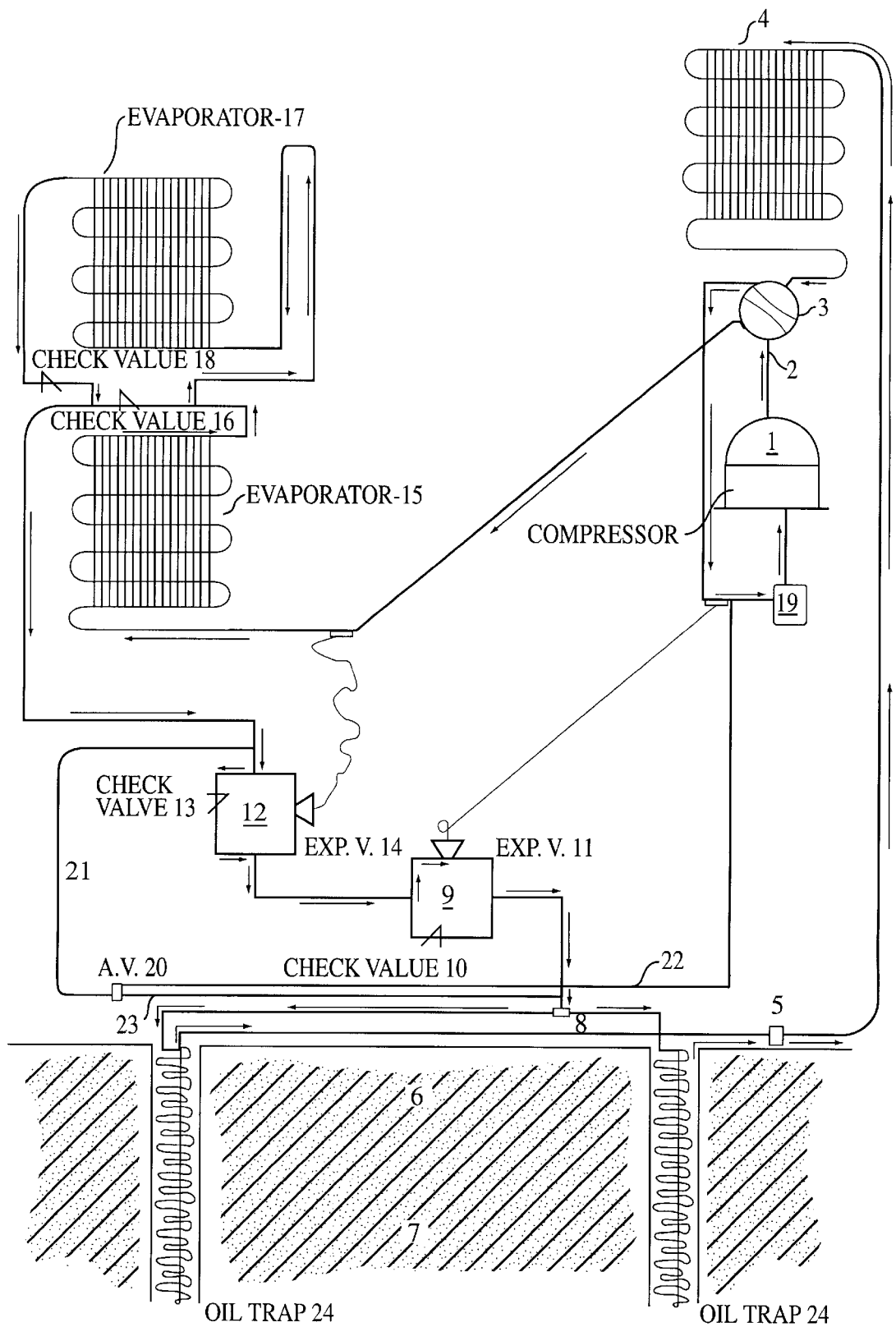
FIG. 2 is a schematic diagram of the device having a reverse cycle, with the arrows indicating the direction of travel of the refrigerant through the system in the heating mode.

Referring now to the drawing figures, the system is shown in the cooling cycle in FIG. 1. Beginning at the discharge line 2 of the high pressure side of compressor 1, hot gaseous refrigerant is discharged from the compressor, and enters reversing valve 3, which directs the hot gas through the air cooler condenser 4. By means of condenser 4, heat from the refrigerant is dissipated into the atmosphere. Since the pressure remains constant, as the refrigerant gas loses sufficient heat, it changes state into a liquid. The warm, liquid refrigerant is directed through distributor 5 into the vertical ground coils 6. It is sub-cooled by coming in contact with the 68° F. ground 7. This sub-cooled liquid moves through distributor 8, to manifold 9, which incorporates a check valve 10, and expansion valve 11. The check valve is open to the flow of the refrigerant in this direction, permitting the liquid refrigerant to flow to manifold 12. Manifold 12 also has a check valve 13 that does not open in this direction, and compels the sub-cooled liquid refrigerant to be metered through the expansion valve 14.

This expansion valve lowers the pressure of the refrigerant, thereby lowering the temperature of the liquid refrigerant, and directs the refrigerant through evaporator 15, where it comes in contact with the warm air stream that is circulating in the building. Before passing through evaporator 15, the cold liquid travels through check valve 16 which is open in this direction. Check valve 18 is closed in this direction, and the cold refrigerant passes through evaporator 15.

The cold liquid absorbs heat as it travels through the indoor evaporator coil 15 inducing the refrigerant to boil off as a gas as it takes heat with it. The relatively cool (heat laden) but light gas is easily pulled back through the change over or reversing valve 3.

The relatively cool but heat laden refrigerant in the gaseous state travels through the suction line into the suction accumulator 19 and enters the suction, or low pressure side of the compressor 1. The refrigerant is compressed to a higher pressure and higher temperature. This hot gas travels through the discharge line 2 of the compressor 1. The gas is circulated through the system as described until the temperature of the building reaches the desired level, whereupon thermostatic means causes the system to discontinue operation.

Automatic valve 20 operates only in the cooling cycle. When the system is first used in the cooling cycle and the ground coils are the coldest part of the system, the refrigerant migrates and settles, in the liquid state, in the coils. This liquid remains in the ground coils, even when the system is in operation. The hot gas from the compressor cools to the ground temperature of 68° F., and liquifies. The liquid refrigerant remains in the ground coils, making the system inoperable.

Automatic valve 20 is used to bypass the expansion valve 14, and allows the refrigerant to enter evaporator 15. When the weather is cool or cold at night, and warm or hot during the day, so that the building requires cooling in the day and heating at night, valve 2 performs as a headmaster or a fan cycling switch.

Vertical ground coils have not worked in the prior art due to the accumulation of liquid refrigerant within the ground coils, and the difference in the amount of refrigerant needed between the cooling and the heating cycles.

Another problem associated with vertical ground coils eventually causes the compressor to become inoperable. This problem is corrected by the use of small oil traps 24 in the present invention which are located at the bottom of each coil. When the small trap fills with oil, head pressure on one side and suction on the opposite side pushes and pulls the oil back to the low side accumulator 19. There, the oil mixes with the refrigerant in safe amounts, and is returned to the crank case of the compressor 1. To overcome the problem of insufficient refrigerant in evaporator 15 during the cooling cycle, automatic valve 20 controls the refrigerant flow through conduit 21 which is provided to supply refrigerant to the evaporator 15 as needed. Sensing conduit 22 senses the low side pressure, and if the pressure is too low, automatic valve 20 opens and supplies refrigerant from the ground coils through conduit 21 and 23 bypassing expansion valve 14 to the evaporator 15. The evaporator 15 is now filled, and as back pressure increases, the automatic valve 20 begins to seat, and closes.

This operation is accomplished due to pressure from the discharge side of the compressor pushing the refrigerant through the inlet side, while the suction of the compressor is pulling from the opposite side of the ground coils. By applying pressure on one side, and reducing pressure on the opposite side, liquid refrigerant leaves the vertical ground coils as it is pushed and pulled through automatic valve 20 via conduit 21 and 23 into evaporator 15. At this point evaporator 15 is relatively cold, at about 35° to 45° F., while the ground temperature is at about 68° F. Since the evaporator is colder than the ground, the system operates on the cooling cycle. Automatic valve 20 is now seated and closed, allowing the system to operate normally, by use of expansion valve 14.

Evaporator 15 is sized for proper cooling and dehumidification on the cooling cycle. Second evaporator 17 is used in the heating cycle.

The device sub-cools the liquid refrigerant, enabling the device to perform in a superior manner to prior art condensers or outside heat pump sections in the cooling cycle. During the first load on the condenser and the compressor, heat is removed from the liquid at condensing temperatures, cooling it to the evaporator temperatures. This heat is subtracted from the latent heat of the refrigerant at 40° F., and lessens the refrigeration effect of the system.

EXAMPLE

Prior Art Device

| | | |
|---|---|---|
| Heat content of liquid (R22) at 110° F. | = | 44.36 BTU/lb. |
| Heat content of liquid (R22) at 40° F. | | −21.70 BTU/lb. |
| Conventional system uses to cool to evaporator temp. | = | 22.66 BTU/lb. |
| Latent heat of refrigerant 22 at 40° F. | = | 87.36 BTU/lb. |
| Heat removed to cool from 110° F. liquid to 40° F. | | −22.66 BTU/lb. |
| Refrigerant effect | = | 64.73 BTU/lb. |

Present Invention

| | | |
|---|---|---|
| Heat content of refrigerant (R22) liquid at 70° F. | = | 30.99 BTU/lb. |
| Heat content of refrigerant (R22) liquid at 40° F. | | −21.70 BTU/lb. |
| Invention used for cooling from 70° F. to 40° F. Evaporating temperature | = | 9.29 BTU/lb. |
| Latent Heat of refrigerant (R22) at 40° F. | = | 87.39 BTU/lb. |
| Heat removed to cool liquid (R22) from 70° F. to 40° F. | = | 9.29 BTU/lb. |
| Refrigeration effect | = | 78.10 BTU/lb. |

Refrigerant values refer to refrigerant tables for (R22) ($CHCLF_2$) for liquid and saturated vapor—published by Freon product division, E.I. DuPont de Nemours and Company. Refer also to properties of (R22), by the American Society of Refrigeration Engineers.

64.73÷78.10=0.829 or 17.2% more BTU/Ib. at 70° F. than 100° F. liquid refrigerant.

An embodiment of the present invention using ground coils draws 27 amps. The nameplate rating for the same BTU/hour capacity prior art system is 321 amps.

27÷32=0.844 or 15.6%

An embodiment of the present invention 15.6% less electricity than the conventional system at 95° F. outside ambient air temperature and 78° F. indoor air temperature, with 50% relative humidity. At 70° F. liquid condensing temperature, the head pressure of the device is considerably less. Therefore, the load on the compressor motor is less and uses 15.6% less electricity. When the outside air temperatures rises above 95° F., the heat pressure rises and the work load increases on the compressor motor. Consequently, the ampere draw increases. The ampere load of the present invention remains the same, therefore the electrical savings provided by the invention is increased.

The example above reveals an improvement of 17.2% more BTU/hour, with 15.6% less electricity needed. This indicates that the present invention is 32.8% more efficient in the cooling cycle at 95° F. outside air than the conventional air to air system.

THE HEATING CYCLE, FIG. 2

The heating cycle is described as beginning at the discharge point 2, which is the high pressure side of the compressor 1. The hot, gaseous refrigerant enters conduit 2 as it is discharged from the compressor 1. The refrigerant is directed through the reversing valve 3, which has been reversed so as to direct the refrigerant through the system in a direction which is opposite the direction of the cooling cycle. The hot, gaseous refrigerant leaves reversing valve 3 and goes into the indoor evaporator 15. The evaporator begins to dissipate some of the heat from the hot gas into the building.

As the hot refrigerant leaves evaporator 15 and flows towards check valve 16, which is closed in this direction, forcing the flow through evaporator 17. Heat is removed as it passes through evaporators 15 and 17 which are operating as a condenser. The pressure remains constant as the air cools the refrigerant, and the refrigerant changes from a gas to a liquid.

This liquid refrigerant leaves the indoor coils and travels through check valve 18, which is open in this direction, and enters manifold 12, which contains check valve 13 and expansion valve 14. Check valve 13 is open in this direction, and permits the liquid refrigerant to enter manifold 9 that also has a check valve 10 and expansion valve 11. Check valve 10 is forced to a closed position in this direction, sending the liquid refrigerant through expansion valve 11. Expansion valve 11 meters the refrigerant through distributor 8, and permits the refrigerant to flow into the individual vertical ground coils 6.

The cold refrigerant passes into the ground coils 6, and attracts and absorbs heat from the surrounding warm earth 7. Some of the refrigerant in the liquid state boils off, and becomes a gas containing heat absorbed from the warm ground. This warm, heat laden gas is lighter than the remaining liquid, and is easily pulled back to the compressor.

This heat laden, but relatively cold, light refrigerant returns to the compressor through distributor 5, and into the outdoor air treated condenser 4, now operating as an evaporator, where the refrigerant is super heated. The super heated refrigerant is directed towards the change over, or reserving, valve 3, which directs the gaseous refrigerant into the accumulator 19, and back to the suction, or low pressure, side of the compressor.

This relatively cool, but heat laden, super heated gas refrigerant is compressed by the compressor, raising the pressure of the gas and, accordingly, raising the temperature. The high pressure hot gas is sent from the compressor 1 through conduit 2 to reversing valve 3. From the reversing valve 3, the hot gas travels into, and through, evaporators 15 and 17, which are operating as condensers, heating the building in which these indoor coils are located.

The system operates in this manner until the desired room temperature is reached, and the system is turned off by thermostatic means.

The use of two evaporators as an indoor heat exchanger balances the system with the evaporator surface in the heating cycle, which consists of two ground coils 6 and an outside condenser 4. Otherwise, the system would be overloaded, with extremely high head pressures in the heating cycle making the system inoperable. This combination increases the capacity of this system dramatically in the heating cycle. The combination of the ground coils 6 and the air cooled condenser 4 functioning as an evaporator, increases the evaporator surface (face area) to such an extent that the evaporators operate at about 10° F., or less, temperature difference less.

The double evaporators used as a condenser in the heating cycle provide extra surface for heat dissipation. Capacity is increased, without the need of extremely high discharge pressures.

The improved temperature difference means, when the ambient air temperature is 40° F., the evaporator temperature would be about 30° F., or greater. When the ambient air temperature is 30° F., the evaporator coil temperature is about 20° F., and if the dew point temperature is colder than 20° F., the outside evaporator 4 will not collect ice. As the outside air becomes colder, for example, at an outside temperature of 20° F., with the evaporator coil temperature at 10° F., and a dew point temperature of 0° F., the invention will be ice free, and will not need a defrost cycle required by prior art systems.

Conventional systems operate at a 30° F. to 40° F. temperature difference, and will, or may, collect ice at 40° F., or warmer, ambient air. It is possible for the invention to remain ice free, depending on the dew point temperature, even if the ambient air temperature is 0° F. or colder.

The capacity of any system drops in direct proportion to the drop in evaporator temperature. If the pressure on the suction side is relative high, the movement of the gas is rapid. Because of the higher pressure, the gas density is greater, so an increased weight of refrigerant can be handled within a given time period. Accordingly, the system capacity is relatively high. If the suction pressure is low, the gas is less dense, and a smaller weight of refrigerant is handled during a given time period, and the capacity of the compressor is reduced.

Since the embodiment of the invention operates at less temperature difference, it operates at a higher suction pressure than a conventional heat pump system at the same ambient air temperature. Therefore, during the heating cycle, the invention operates at a much higher capacity with greater efficiency.

While the present invention operates at a 10° F. temperature difference, a conventional system operates at a 30° to 40° F. temperature difference. The following example uses only a 30° F. temperature difference:

Outside Air 50° F.

| | | |
|---|---|---|
| 1-H.P. Invention 40° F. suction | = | 13526 BTU/hr. |
| 1-H.P. Conventional system 20° F. suction | = | 9047 BTU/hr. |
| Difference | = | 4479 BTU/hr. |

The embodiment of the invention absorbs and rejects 4490 BTU/hr. more than in the area being treated than the conventional system, at 50° F. outside ambient air temperature.

It takes 1426 watts of electric strip heat to overcome this deficit.

1—H.P. Invention uses 1372 watts to supply 13526 BTU/hr.

1—H.P. Conventional system to produce the same BTU/hr. capacity needs 2792 watts.

1372÷2792=0.491 or 51% less electricity used by the embodiment of the invention to supply the same number of BTU/hr.

Outside Air 40° F.

| | | |
|---|---|---|
| 1-H.P. Invention 30° F. suction | = | 11184 BTU/hr. |
| 1-H.P. Conventional system 10° F. suction | = | 7161 BTU/hr. |
| Difference | | 4023 BTU/hr. |

The embodiment of the invention absorbs and rejects 4023 BTU/hr. more in the area being treated than the conventional system at 40° F. outside ambient air temperature.

It takes 1281 watts of electric strip heat to overcome this deficit.

1—H.P. Invention uses 1080 watts to supply 11184 BTU/hr.

1—H.P. Conventional system uses 2361 watts to supply 11184 BTU/hr.

1080÷2361=0.457 or 0.543% less electricity used by the embodiment of the invention to supply the same number of BTU/hr.

Outside Air 30° F.

| | | |
|---|---|---|
| 1-H.P. Invention 20° F. suction | = | 9047 BTU/hr. |
| 1-H.P. Conventional system 10° F. suction | = | 5439 BTU/hr. |
| Difference | | 3608 BTU/hr. |

The embodiment of the invention absorbs and rejects 3608 BTU/hr. more in the area being treated than the conventional system at 30° F. outside ambient air temperature.

It takes 1149 watts of electric strip heat to overcome this deficit.

1—H.P. Invention uses 1040 watts to supply 9047 BTU/hr.

1—H.P. Conventional system uses 2189 watts to supply 9047 BTU/hr.

1040÷2189=0.475 or 0.525% less electricity used by the embodiment of the invention to supply the same number of BTU/hr.

These figures do not take into consideration that the invention would require fewer, and maybe zero, defrost cycles, demonstrating an even higher level of efficiency over the prior art.

What is claimed is:

1. A heating and air conditioning device using geothermal heat exchange, comprising:

a. a compressor means for compressing and circulating a refrigerant;

b. a first indoor heat exchange coil which receives refrigerant in the heating and cooling cycle for heat exchange between said refrigerant and inside air;

c. a second indoor heat exchange coil which receives refrigerant in the heating cycle only for heat exchange between said refrigerant and inside air;

d. at least one outside ground coil which extends generally vertically below a surface of earth, wherein said at least one outside ground coil is surrounded by said earth, and said refrigerant is transported by said compressor means into said at least one outside ground coil for heat exchange between said refrigerant and said earth surrounding said at least one outside ground coil;

e. a valve which is positioned between said first indoor heat exchange coil and said second indoor heat exchange coil, wherein said valve is closed when said refrigerant flows in the cooling cycle and is open when said refrigerant flows in the heating cycle.

2. A heating and air conditioning device using geothermal heat exchange as described in claim 1, wherein said valve is a check valve.

3. A heating and air conditioning device using geothermal heat exchange, comprising:

a. a compressor means for compressing and circulating a refrigerant;

b. a first indoor heat exchange coil which receives refrigerant in the heating and cooling cycle for heat exchange between said refrigerant and inside air;

c. a second indoor heat exchange coil which receives refrigerant in the heating cycle only for heat exchange between said refrigerant and inside air;

d. at least one outside ground coil which extends generally vertically below a surface of earth, wherein said at least one outside ground coil is surrounded by said earth, and said refrigerant is transported by said compressor means into said at least one outside ground coil for heat exchange between said refrigerant and said earth surrounding said at least one outside ground coil;

e. a valve which is positioned between said compressor and said second indoor heat exchange coil, wherein said valve is closed when said refrigerant flows in the cooling cycle and is open when said refrigerant flows in the heating cycle.

4. A heating and air conditioning device using geothermal heat exchange as described in claim 3, wherein said valve is a check valve.

\* \* \* \* \*